Aug. 31, 1954  R. C. CHATTIN  2,687,683
LONGITUDINAL ADJUSTABLE COMPOUND GROUND-WORKING TOOL
Filed March 24, 1952
3 Sheets-Sheet 2
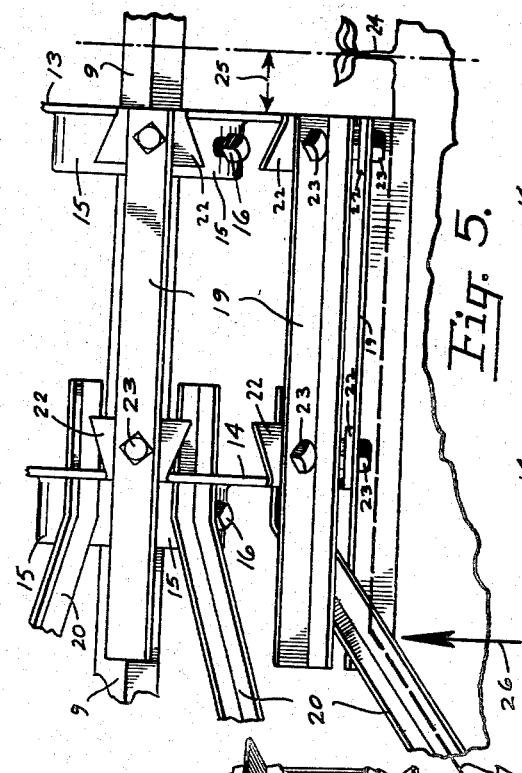
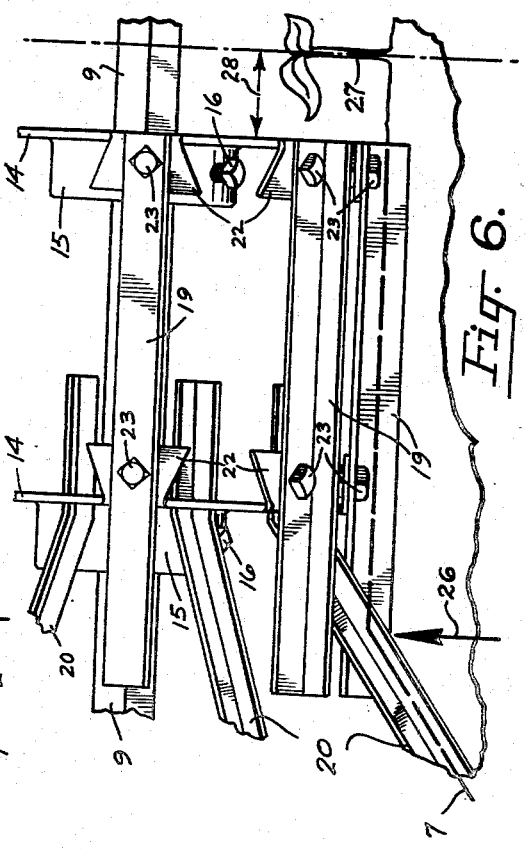
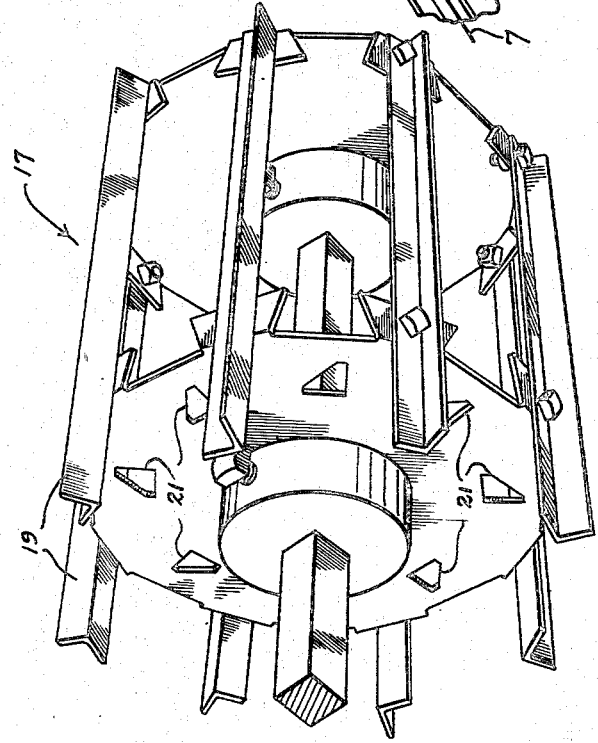
INVENTOR.
Robert C. Chattin
BY
Atty.

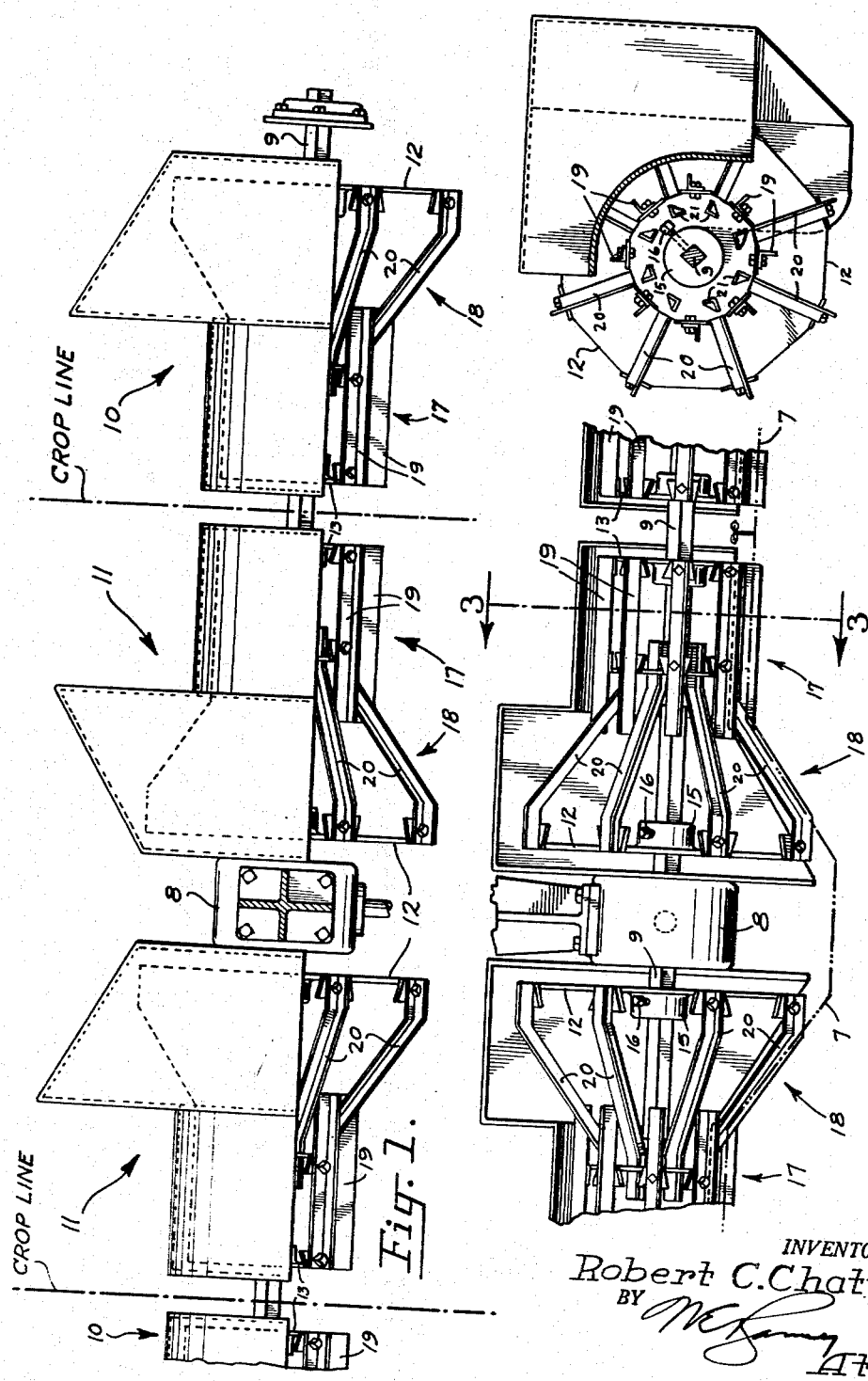

Aug. 31, 1954

R. C. CHATTIN 2,687,683

LONGITUDINAL ADJUSTABLE COMPOUND GROUND-WORKING TOOL

Filed March 24, 1952

INVENTOR.
Robert C. Chattin
BY
Atty.

Patented Aug. 31, 1954

2,687,683

UNITED STATES PATENT OFFICE 2,687,683

LONGITUDINAL ADJUSTABLE COMPOUND GROUND-WORKING TOOL

Robert C. Chattin, Boise, Idaho

Application March 24, 1952, Serial No. 278,255

12 Claims. (Cl. 97—215)

My invention is directed to a compound mulching unit for the cultivation of high bed planting areas such, for example, as the high beds in which cotton and lettuce are grown in the warm farming areas of California. More specifically, my invention pertains to a correlated frusto-conic and cylindrical rotor which are mounted side by side in axial alignment to define a compound mulching unit which, simultaneously, will cultivate the top and the sloping side of a high bed. By virtue of this simultaneous cultivation, the instant invention is related to that disclosed in my copending application Ser. No. 327,641, filed December 23, 1952 and entitled Ground Working Tool With Oblique Deflecting Shield.

One object of my invention is to provide a ground working tool having a compound frusto-conic and cylindrical rotor which is adjustable longitudinally to vary the overall length of the ground working tool while maintaining a fixed position for the frusto-conic portion so cultivation can be effected on a constant profile but at a variable distance from the crop line. In this adjustment particular, the instant invention is related to my copending application, Ser. No. 207,333, filed January 23, 1951, and entitled Extensible Rotor.

In the Imperial and San Joaquin Valleys of California, lettue and cotton conventionally are planted and grown in high, mound-like beds which alternate with irrigation ditches or laterals in order that moisture may be brought to the roots of the plants by hygroscopic or subterranean action. Thus, a typical cotton or lettuce field in this area is corrugated in appearance with long alternate rows of high bed planting areas and recessed or depression like irrigation laterals, the tops of the high beds being flat and having either one or two rows of lettuce or cotton planted therein. To bring moisture to the roots of the plants without wetting the leaves or stems, the irrigation laterals are filled to a low depth and seepage and hygroscopic action are depended upon to bring the moisture up through the beds. In practice, it has been found that this method of irrigation produces a superior yield and crop. However, as is evident, the efficiency of this irrigation procedure directly is related to the porosity of the soil, its condition of cultivation, and the weed growth along the sides and tops of the beds.

Heretofore, it has been the general practice to cultivate against weeds and to enhance the irrigation of high bed planting areas either manually with migratory farm labor or mechanically with tractor mounted knives and the like. As wages for migratory Mexican and other farm labor have risen, many farmers and ranchers have turned to the mechanical methods of cultivation. However, those areas which utilize high bed planting and irrigation are particularly difficult to cultivate. Thus, the top soil in these areas often is hard, crusted and sun-baked during the growing season and weed growth is prolific. Further, the beds have sloping sides and flat tops and this profile must be maintained. Faced with these problems, many farmers have found that a rotary mulching machine functions ideally to cultivate high beds and initially to prepare the soil for planting. The instant invention is directed toward an improved rotary mulching machine for use under these adverse conditions.

To illustrate the diverse uses for a mulching machine in these irrigated, high bed areas, various crops and stages of growth must be considered. For example, cotton may be grown in a single row along the top of a high bed planting area involving hundreds of acres. The young cotton plant resembles a beam plant just after sprouting. That is to say, it has a tall, thin and fragile stem topped by leaves. Cultivation of the plants should proceed to within two inches of the stem yet physical damage thereto must be avoided. Such close cultivation requires a nicety of control. Lettuce plants, on the other hand, usually are planted in twin rows and the young plant is leafy and bushy with only a short stem. Accordingly, cultivation in lettuce cannot proceed as close to the stem or crop line yet an equal nicety of control must be exercised to prevent physical damage. Still further conditions are met with in operating a mulcher. Thus, the type of soil may vary even in a given locality and the mulcher must be adjusted to take this variance into consideration. In short, consideration of the various crops and various soils points up the fact that the efficiency of the cultivation and irrigation and, hence, the efficiency of the mulching machine directly are related to and dependent upon the adjustability and structural strength of the rotors and the blades which are carried thereby. It is this twin requirement of adjustability and strength, however, which I have found to be lacking in those mulchers heretofore employed in the cultivation of high beds.

Accordingly, one object of my invention is to provide a compound frusto-conic rotor (for the side of a high bed) and cylindrical rotor (for the top margin thereof), which compound mechanism is capable of ready longitudinally adjustment to meet the varying soil conditions and crop types encountered by a farmer in the irrigated districts under consideration.

A further object of my invention is to provide a rotor of the above type in which a common central mounting disk is employed, this disk slidably carrying the blades on one rotor and fixedly carrying the blades on the other rotor in accord with either of two species which hereinafter will be described.

Another object of my invention is to provide a combination frusto-conic and cylindrical rotor in which the ends of the frusto-conic and cylindrical portions overlap and intermesh with respect to a common mounting disk, the end of the cylindrical rotor being fixed to the mounting disk and the end of the frusto-conic rotor being slidably carried thereby so the overall length of the mulching unit may be varied without disturbing the relationship of the frusto-conic portion to the sloping side of a high bed profile line.

Toward the attainment of the above objectives, my mulching unit may be constructed in accord with either of two species. Both species include a bladed frusto-conic rotor and a bladed cylindrical rotor which longitudinally are aligned end to end and which are mounted upon a common drive shaft. Additionally, a mounting disk mutually carries the adjacent ends of the rotors. In the first species, the cylindrical rotor is fixed to the periphery of the mounting disk and the frusto-conic rotor is slidable in aperture-like pockets carried radially in therefrom. In the second species, the reverse is true. That is to say, the frusto-conic rotor is fixed and the cylindrical rotor is slidable. Thus, these two novel mounting structures allow the cylindrical rotor to be adjusted longitudinally toward and away from the frusto-conic rotor so that cultivation may proceed closer to or further from the crop line yet the relationship of the frusto-conic rotor to the sloping profile along the side of the bed will be constant.

These and other objects and advantages of my invention will be set forth in the following detail description, taken in conjunction with the accompanying drawings, wherein:

Fig. 1 is a top plan view of a high bed mulching machine in which the various individual units are adjustable longitudinally while maintaining the profile, all in accord with my invention;

Fig. 2 is a front view of a portion of the mulcher shown in Fig. 1, this figure better illustrating the manner in which the adjacent ends of both rotors are carried upon the intermediate mounting disk;

Fig. 3 is a detail view, taken substantially on the line 3—3 of Fig. 2, showing the manner in which the adjacent ends of the rotors of the first species are spaced and staggered with relation to one another;

Fig. 4 is a perspective view of a cylindrical rotor per se better showing the attachment plates for the cylindrical blades and the triangular apertures or pockets in which the ends of the frusto-conic blades slidably are accommodated in the first species;

Figs. 5 and 6 are related detail views showing two adjusted positions of the cylindrical rotor with respect to a crop line, the vertical arrows in these figures indicating the profile line of the bed and the manner in which the frusto-conic rotor is maintained in a fixed position with respect to this profile line;

Figure 7:
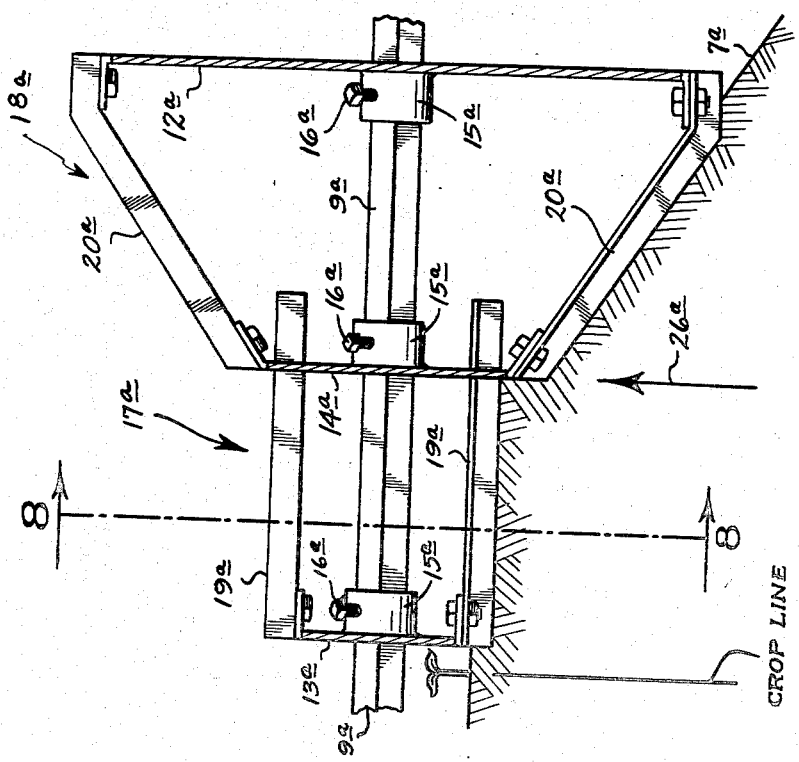
Figure 8:
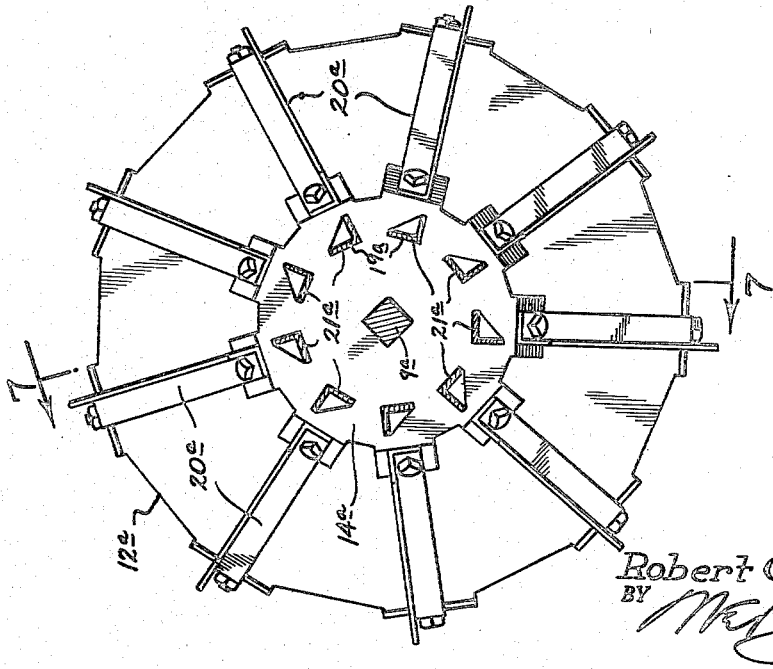

Fig. 7 is a front view of the second species (some of the blades being removed for clarity) in which the relationship of the frusto-conic rotor to the profile line, crop line, and edge of the bed all is indicated by means of appropriate symbols; and Fig. 8 is a section detail, taken substantially on the line 8—8 of Fig. 7, showing the manner in which the apertures are arranged radially in from the frusto-conic blade attachment points.

In the initial preparation of a plowed and cultivated high bed field, a lister is operated back and forth to pile up alternate mounds and depressions. Thereafter, a former may be employed to level off the tops of the mounds and to give the desired angularity to the profile of the beds as shown by the profile line 7 in Figs. 2, 5 and 6 or the profile line 7a in Fig. 7. It is the flap top of each high mound which defines the planting bed and, conventionally, a single row of cotton is planted thereon. The intervening low or valley areas, on the other hand, define ditches serving as laterals for the flow of irrigation water.

Assuming cotton to be typical, it is essential, after the cotton plants sprout and grow to a short height, that the outer margins and sloping sides of the beds be cultivated. This is done so the infesting weeds will be cut off and their further growth inhibited, the crusted and sun-baked soil be broken up, fluffed, and mulched and the passage of moisture from the irrigation laterals through the beds by hygroscopic and subterranean action be enhanced. It is a cultivation of this type with which the mulching mechanism of the instant invention is concerned.

As will be understood by those skilled in the art, the mulching mechanism which is shown in Figs. 1 and 2 is suspended from a tractor and rotatably is driven from the power take-off shaft thereof. An exemplary power transfer mechanism for attaching the unit of Figs. 1 and 2 to the power take-off shaft of a tractor is illustrated in my copending application Ser. No. 278,256 filed March 24, 1952, and entitled Power Take-Off Mechanism for Tractors. In Figs. 1 and 2, however, I have shown only that portion of the power train which terminates with a gear housing 8. This gear housing carries a gear system which is joined to an elongated rotatable drive shaft 9 upon which various ones of the rotors per se are mounted.

I have illustrated my invention with respect to a two row mulcher which is adapted to straddle two high bed crop rows as indicated by the legends "crop line" in Figs. 1 and 7. To this end, four mulching units are provided, the outboard units 10 serving to cultivate one side and a corresponding portion of the top of a bed and the inboard units 11 serving to cultivate the opposite side and top portion. Generally speaking, the inboard and outboard units are allochiral so a detailed description of but one unit will suffice.

In detail, each of the mulching and profiling units of the first species is provided with a first end disk 12, a second end disk 13, and an intermediate or mounting disk 14. Each of the end disks 13 and the intermediate disks 14 are of equal size with equal circumferences but the other end disks 12 are somewhat larger for a purpose hereinafter to be described. Each of the disks carries a collar 15 having a set screw 16 for securing the disks to the elongated drive shaft 9.

Thus, the aperture in each of the collars 15 and the drive shaft 9 preferably is non-circular (square) in order that the disks will rotate with the drive shaft yet longitudinal adjustment of each disk relative to the shaft may be accommodated. Such adjustment is effected by backing off the appropriate set screw or set screws 16 and, thereafter, sliding the disks and collars longitudinally of the drive shaft.

Referring to Fig. 2, I have termed the two cooperating halves of each mulching unit a "cylindrical" rotor 17 and a "frustoconic" rotor 18. Thus, each cylindrical rotor 17 carries a first plurality of blades 19 which are arranged parallel to the drive shaft 9 so as to cultivate the flat top of a bed. The frusto-conic rotor, on the other hand, carries a second plurality of blades 20 which are arranged at an oblique angle to the drive shaft 9 in order to cultivate the sloping side of a bed. As shown, the end to end alignment of the cylindrical and frusto-conic rotors 17 and 18 is enhanced by the peripheral staggering of the blades 19 and 20 (see Fig. 3). Thus, the various blades are intermeshed and they extend longitudinally beyond the mounting disk 14 toward one another. Such an extension provides a constant profile as shown in Fig. 5 and as hereinafter more fully will be explained.

Referring now to Fig. 4, the intermediate or mounting disk 14 is pierced by a plurality of non-circular apertures 21. These apertures are complementary individually to the ends of the frusto-conic rotor blades 20 so as to provide pockets therefor. Thus, the blades 20 slidably are receivable in the apertures 21 to accommodate longitudinal adjustment of the blades relative to the disk 14, yet rotational movement of each blade is prohibited by the conformation of blade and aperture.

Peripherally, the intermediate or mounting disk 14 carries a plurality of attachment plates 22 which are arranged perpendicular to the plane of the disk and each has fixed thereto, as by a bolt 23, one of the cylindrical rotor blades 19. A similar arrangement of attachment plates and bolts may be utilized to secure the other end of each of the blades 19 to the rotor 13 and to secure the ends of the blades 20 to the disk 12. In any event, it will be noted that the apertures 21 are spaced equal distances radially in a circular pattern arranged inwardly from the periphery of the mounting disk 14 whereas the attachment plates 22 are spaced about the outer periphery thereof. Further, the attachment plates and apertures are staggered with respect to one another (see Fig. 4) so that an attachment plate is arranged peripherally intermediate each adjacent pair of apertures. This arrangement accommodates ready adjustment of the blades 20 relative to the blades on the cylindrical rotor 19.

In assembling the cylindrical rotor 17 and the frusto-conic rotor 18 prior to working, the various set screws 16 are backed off and the collars and disks are moved longitudinally along the drive shaft 9 to the appropriate positions. During this movement, the ends of the frusto-conic blades 20 slide within the complementary apertures 21 and the disks 13 and 14 and move as a unit with the blades 19 fixed thereto. Thus, the farmer can select an appropriate overall length which is correlated to the width of top bed cultivation desired.

Having achieved the desired adjustment of the rotors, let it be assumed that a high bed planted with young cotton plants is to be cultivated. In Fig. 5, the profile line of this high bed is indicated at 7 and a fragile stemmed cotton plant is shown at 24. As is apparent, cultivation should proceed as close to this plant as is possible without physically damaging the thin fragile stem and without disturbing the root system. To this end, I have shown a double ended arrow 25 in Fig. 5 to indicate the appropriate spacing and the distance between the end disk 13 and the crop line. Referring further to Fig. 5, the marginal edge or side of the high bed profile line is indicated by a large arrow 26. That is to say, the arrow 26 points to the line which divides the sloping side of the bed from the flat top thereof and this line should be maintained after cultivation as explained in my copending application Serial No. 327,641, filed December 23, 1952, and entitled Ground Working Tool With Oblique Deflecting Shield.

Typically, the mulching mechanism is tractor mounted and, in operation, the tractor is moved along the rows of growing plants parallel the crop line. At the same time, the mulching unit is driven from the power take-off shaft of the tractor in order to cultivate both the sloping sides (with the frusto-conic rotor) and the tops (with the cylindrical rotor) simultaneously. This cultivation, of course, cuts off the growing weeds and inhibits further growth, fluffs, mulches, and breaks up the crusted and sun-baked top soil, and conditions the planted area so the passage of moisture, from the irrigation laterals up through the beds, is enhanced.

To illustrate a typical adjustment of my mulching mechanism, a growing cotton plane 27, slightly older and more bushy than the plant shown in Fig. 5, has been shown in Fig. 6. Thus, cultivation of the larger plant should not proceed any closer to the thin fragile stem than is indicated by the double ended arrow 28 in Fig. 6. This lateral distance 28 is greater than the previous distance 25. At the same time, however, the profile of the high bed must be maintained so sufficient soil and moisture will be available when the cotton approaches maturity. That is to say, the arrow 26 in Fig. 6 again indicates the side or edge of the planting area profile line and this location should be a fixed point throughout the growing season. To this end, the farmer will back off the set screws 16 holding the disks 13 and 14 to the drive shaft. Thereafter, these disks (13, 14) and the blades 19 are moved to the left (in Fig. 6) as a unit. This movement causes the ends of the blades 20 to slide in the complementary apertures 21 so the effective overall length of the compound mulching unit is shortened, and the lateral cultivation area on the top of the bed is shortened. However, as the arrow 26 in Figs. 5 and 6 illustrates, this adjustment and this shortening of the unit does not vary the critical relationship of the frusto-conic rotor 20 to the sloping side of the bed. That is to say, the profile of the bed will be maintained because of the novel mounting of the blades 19 and 20 on the intermediate disk and because of the relationship of the rotors one to another.

Turning now to the second species of my invention (see Figs. 7 and 8), there are provided a first end disk 12a, a second end disk 13a, and an intermediate or mounting disk 14a. In relative size, however, these disks differ from the disks of the first species. Thus, the intermediate disk 14a is larger in diameter than the second end disk 13a and the first end disk 12a is larger in diameter than the intermediate disk.

Also, as with the previous species, an elongated square drive shaft 9a is provided and each of the disks carries a collar 15a with which to mount the disk upon the shaft by tightening a set screw 16a. Adjustment of the overall length of the mulching unit is effected by backing off the appropriate set screw 16a and, thereafter, sliding the disk 13a and its collar longitudinally of the drive shaft.

As shown in Fig. 7, the two cooperating halves of the mulching unit includes a "cylindrical" rotor 17a and a "frustoconic" rotor 18a. The cylindrical rotor 17a carries a first plurality of blades 19a which are arranged parallel to the drive shaft 9a so as to cultivate the flat top of a bed. The frustoconic rotor, on the other hand, carries a second plurality of blades 20a which are arranged at an oblique angle to the drive shaft 9a in order to cultivate the sloping side of the bed.

Referring now to Fig. 8, the intermediate or mounting disk 14a is pierced by a plurality of non-circular apertures 21a. These apertures are complementary to the corresponding ends of the cylindrical blades 19a so as to provide pockets therefore. Thus, the blades 19a slidably are received in the apertures 21a to accommodate longitudinal adjustment of the blades relative to the disk 14a, yet rotational movement of each blade is prohibited by the conformation of blade and aperture.

The above description makes evident the difference between the first and second species of my invention. Thus, in the second species, the intermediate or mounting disk 14a has the frusto-conic blades 20a fixed to the periphery thereof. The cylindrical blades 19a, on the other hand, are slidable in the apertures 21a. Accordingly, an adjustment of this species is accomplished by backing off the set screw 16a which retains the second end disk 13a and, thereafter, by moving the said second end disk 13a and the blades thereon, as a unit, toward or away from the frusto-conic rotor 18a. In Fig. 7, the marginal edge or side of the high bed profile line is indicated by a large arrow 26a. As with the previous species, cultivation should proceed as close to the crop line as is practical without disturbing the relationship of the frusto-conic rotor 18a with respect to the edge of the planting area 26a. A further difference between the species is evident in the configuration of the profile line 7a with respect to the profile line 7. Thus, the profile line 7a traces a small vertical line at both edges of the planting area whereas the side of the planting area of the first species was maintained at a constant slope. The particular configuration will, of course, depend upon the rancher or farmer doing the cultivation and upon the practice in the area where the high beds are located.

As is evident, the advantages flowing from the first species also flow from the second species and the adjustment of both mechanisms is quite similar. However, it will be noted in the second species of my invention that nine individual blades are provided both on the cylindrical rotor and on the frusto-conic rotor. This nine blade disposition has been found to offer a more rugged, a more efficient and a longer lived mechanism. However, the details thereof form no part of the instant invention. On the other hand, the disposition of the various blades relative to one another is a feature of the instant invention. To this end, it will be noted in Fig. 8 that each of the apertures 21a is located radially in from the corresponding frusto-conic blade 20a. This radial alignment causes the blades on both the cylindrical and frusto-conic rotors to contact the ground at the same time, the corresponding blades in the first species having been staggered so as to contact the ground at different times.

In summation, it will be seen that I have provided a mulching machine of particular utility in the cultivation of high beds. With this novel structure, a bladed frusto-conic rotor and a bladed cylindrical rotor longitudinally are aligned end to end for rotataion about the common axes thereof. Further, the blades of both rotors are carried by a common intermediate mounting disk, the blades of one rotor being fixed thereto and the blades of the other rotor being slidably accommodated. Accordingly, a structurally superior mulching machine is provided and the critical relationship of the frusto-conic rotor to the sloping side of a high bed profile line is maintained while and after the overall length of the unit is adjusted. Further, such an adjustment can be effected with only a wrench and a farmer or rancher with a minimal mechanical knowledge can accomplish the adjustment without varying the setting of the frusto-conic rotor relative to the profile of a high bed.

I claim:

1. An adjustable mulching unit for high bed planting areas, comprising a multi-bladed frusto-conic rotor and a multi-bladed cylindrical rotor arranged end to end in axial alignment with the smaller diameter of the former immediately adjacent the latter and with the larger diameter remote therefrom, a common mounting disk means mutually carrying the adjacent ends of said rotors for rotation about the axes thereof, one of said adjacent ends being fixed to said common mounting disk means and the other being slidably adjustable with respect thereto in a direction parallel said axes selectively to vary the overall length of the mulching unit.

2. An adjustable mulching unit as in claim 1 wherein that portion of said common mounting disk which is intermediate the center and the periphery thereof is pierced by a plurality of apertures and wherein the blades on said other adjacent end slidably are received and mounted within said apertures, said apertures and blades being mated and correlated to prevent rotation of the blades in the apertures but to accommodate longitudinal movement of the blades through the apertures during adjustment.

3. A mulching and profiling unit, comprising first and second end disks and an intermediate disk mounted in spaced parallel relationship for rotation about a common axis passing through the centers thereof, a first plurality of elongated blades carried by and spanning the distance between said first end disk and said intermediate disk, said first blades being inclined at an oblique angle to said common axis to define a frusto-conic outline which is smaller diametered adjacent the intermediate disk and larger diametered adjacent the first end disk, a second plurality of elongated blades carried by and spanning the distance between said second end disk and said intermediate disk, said second blades extending longitudinally beyond said intermediate disk and being parallel said common axis to define a cylindrical outline, and at least one of the disks carrying said second blades being movable in a direction parallel said common axis selectively to vary the overall length of said mulching and profiling unit.

4. A mulching and profiling unit as in claim 3 wherein said intermediate disk is larger diametered than said second end disk and wherein said first end disk is larger diametered than said intermediate disk, said second blades being fixed to the periphery of said second end disk and being slidably carried for longitudinal movement with respect to said intermediate disk, said first blades being fixed to the peripheries of both said intermediate and said first end disks.

5. A mulching and profiling unit as in claim 3 wherein said intermediate and second end disks are of substantially equal diameter and wherein said first end disk is larger diametered than either of the former, said second blades being fixed to the peripheries of both said intermediate and said second end disks, said first blades being fixed to the periphery of said first end disk and being slidably carried for longitudinal movement with respect to said intermediate disk, both said second end disk and intermediate disk being movable in a direction parallel said common axis to vary said overall length.

6. An adjustable mulching unit for cultivating the top and sloping side of a high bed planting area upon a constant profile, said unit comprising an elongated square rotatable drive shaft having a frusto-conic and a cylindrical rotor means mounted end to end in axial alignment thereon for mutual rotation therewith, said frusto-conic rotor having a first plurality of elongated blades arranged at an oblique angle to the axis of said drive shaft to bound and to define a frusto-conic outline having a large and a small end, said cylindrical rotor having a second plurality of elongated blades arranged parallel to the axis of said drive shaft to bound and to define a cylindrical outline, said rotors being arranged upon said drive shaft with the small diametered portion of the frusto-conic rotor immediately adjacent the cylindrical rotor and with the large diametered portion of the former spaced from the latter, and a common mounting disk mutually carrying the blades on the adjacent ends of said rotors, said common mounting disk being pierced intermediate the center and periphery thereof by a plurality of apertures, the blades on one of said rotors being mated to and slidably retained within said apertures and the blades on the other of said rotors being fixed to the periphery of said common mounting disk, said cylindrical rotor being adjustable for movement longitudinally of said drive shaft toward and away from said frusto-conic rotor to adjust the overall length of said mulching unit without disturbing the location of the frusto-conic rotor upon the drive shaft.

7. An adjustable mulching unit as in claim 6 wherein the blades on said frusto-conic rotor are fixed to the periphery of said common mounting disk and the blades on said cylindrical rotor slidably are retained within said apertures.

8. An adjustable mulching unit as in claim 6 wherein the blades on said cylindrical rotor are fixed to the periphery of said common mounting disk and the blades on said frusto-conic rotor slidably are retained within said apertures, said common mounting disk being movable longitudinally of said drive shaft with said cylindrical rotor during adjustment.

9. A mulching and profiling unit, comprising an elongated drive shaft, first and second end disks and an intermediate disk mounted in spaced parallel relationship upon said drive shaft, said second end disk being adjustable longitudinally of said shaft, said intermediate disk being larger in diameter than said second end disk and said first end disk being larger in diameter than said intermediate disk, a first plurality of elongated blades fixed to the peripheries of and spanning the distance between said first end disk and said intermediate disk to define a frusto-conic outline, a plurality of apertures piercing said intermediate disk, said apertures being arranged radially in from respective ones of the first blade attachment points to said intermediate disk, and a second plurality of elongated blades fixed to the periphery of said second end disk and slidably retained within said apertures, said second blades being arranged parallel to said drive shaft and protruding through and beyond said apertures to define a cylindrical outline, said second blades and second end disk being adjustable longitudinally of said drive shaft as a unit to adjust the overall length of the mulching and profiling unit without disturbing the location of said frusto-conic outline.

10. An adjustable mulcher comprising an elongated rotatable drive shaft having a non-circular cross-section, a mounting disk means fixed to said drive shaft for rotation therewith but for adjustment longitudinally thereof, a cylindrical rotor having a first plurality of blades arranged parallel to said drive shaft, a frusto-conic rotor spaced longitudinally from said cylindrical rotor and having a second plurality of blades arranged at an oblique angle to said drive shaft, said rotors being aligned end to end with the ends of the blades thereof being intermeshed and extending longitudinally beyond said mounting disk, said mounting disk being pierced by a plurality of peripherally spaced non-circular apertures which are complementary individually to individual ones of said second blades, said apertures being spaced equal distances radially in from the periphery of said mounting disk, a plurality of attachment plates spaced about the marginal periphery of said mounting disk, each of said attachment plates being arranged peripherally intermediate an adjacent pair of said apertures in staggered relationship thereto, the blades on the small end of said frusto-conic rotor being slidably carried in complementary ones of said apertures and the blades on said cylindrical rotor being fixed to corresponding ones of said attachment plates.

11. An adjustable mulcher for cultivating a high bed planting area, said mulcher comprising an elongated rotatable drive shaft, a flat mounting disk means mounted upon said drive shaft for rotation therewith, a cylindrical rotor having a first plurality of blades arranged parallel to said drive shaft, a frusto-conic rotor spaced from the cylindrical rotor and having a second plurality of blades arranged at an oblique angle to said drive shaft, said rotors being aligned end to end with the ends of the blades thereof being intermeshed and extending longitudinally beyond said mounting disk, said mounting disk being pierced by a plurality of peripherally spaced triangular apertures which are complementary individually to individual ones of said second blades, a plurality of attachment plates arranged perpendicular to the plane of said flat mounting disk and spaced about the marginal periphery thereof, each of said attachment plates being arranged peripherally intermediate an adjacent pair of said apertures in staggered relationship thereto, the blades on the small end of said frusto-conic rotor being slidably carried in complementary ones of said apertures, the blades on said cylindrical rotor being fixed to corresponding ones of said attachment plates for movement therewith, and means mounting said disk upon said drive shaft for adjustment parallel the shaft to carry said first blades therewith but slidably to pass said second blades.

12. An adjustable mulching unit for high bed planting areas, comprising a multi-bladed frusto-conic rotor and a multi-bladed cylindrical rotor arranged end to end in axial alignment with the smaller diameter of the former immediately adjacent the latter and with the larger diameter remote therefrom, a mounting disk means carrying the adjacent ends of said rotors for rotation about the axes thereof, one of said adjacent ends being fixed to said mounting disk means and the other being slidably adjustable with respect thereto in a direction parallel said axes selectively to vary the overall length of the mulching unit.

References Cited in the file of this patent

UNITED STATES PATENTS

| Number | Name | Date |
| --- | --- | --- |
| 323,266 | Bradley | July 28, 1885 |
| 827,587 | Warner | July 31, 1906 |
| 1,364,720 | Cook | Jan. 4, 1921 |

FOREIGN PATENTS

| Number | Country | Date |
| --- | --- | --- |
| 67,524 | Denmark | Aug. 16, 1948 |